United States Patent [19]

Kurihara et al.

[11] Patent Number: 4,950,877
[45] Date of Patent: Aug. 21, 1990

[54] APPARATUS FOR TRANSPORTING CARD-LIKE INFORMATION RECORDING MEDIUM

[75] Inventors: Hideo Kurihara, Tokyo; Hitoshi Kurihara, Saitama, both of Japan

[73] Assignee: Canon Kabushiki Kaisha, Tokyo, Japan

[21] Appl. No.: 152,811

[22] Filed: Feb. 5, 1988

[30] Foreign Application Priority Data

Feb. 9, 1987 [JP] Japan .................................. 62-026475

[51] Int. Cl.⁵ ........................................... G06K 13/08
[52] U.S. Cl. ..................................... 235/480; 235/449; 235/454; 235/482
[58] Field of Search ............... 235/449, 454, 475, 480, 235/482; 360/2

[56] References Cited

U.S. PATENT DOCUMENTS

| | | | |
|---|---|---|---|
| 3,896,293 | 7/1975 | Pass ..................................... | 235/480 |
| 4,048,476 | 9/1977 | Lawser et al. ................... | 235/480 X |
| 4,322,613 | 3/1982 | Oldenkamp ......................... | 235/449 |
| 4,581,523 | 4/1986 | Okuno ................................ | 235/449 X |
| 4,733,060 | 3/1988 | Dono et al. ...................... | 235/449 X |
| 4,743,745 | 5/1988 | Kachi et al. ...................... | 235/454 X |

Primary Examiner—David L. Trafton
Attorney, Agent, or Firm—Fitzpatrick, Cella, Harper & Scinto

[57] ABSTRACT

An apparatus for transporting, cleaning or performing recording and/or reproducing of information from a card-like medium is disclosed. The recording medium includes an information recording area and a non-recording area. The transporting apparatus includes a receiving transport device and a discharging transport device. The receiving transport device transports the recording medium into and within the apparatus. The discharging transport device discharges the card-like information recording medium outside the apparatus and includes transporting the recording medium and stopping the recording medium such that the information recording area remains within the apparatus. The apparatus for cleaning the recording medium includes a cleaning device for cleaning the recording medium, a moving device for moving the recording medium relative to the cleaning device and a receiving device for receiving the recording medium in the apparatus. A discharging device transports the recording medium and stops the medium so that the information recording area remains within the apparatus. The apparatus for recording information on and/or reproducing information from the recording medium includes a head unit for performing the recording and/or reproducing of information. A moving device moves the recording medium relative to the head unit and a receiving device receives the recording medium in the apparatus. The recording medium is discharged by a discharging device, so that the information recording area remains within the apparatus.

29 Claims, 9 Drawing Sheets

APPARATUS FOR TRANSPORTING CARD-LIKE INFORMATION RECORDING MEDIUM

BACKGROUND OF THE INVENTION

1. Field of the Invention

The present invention relates to an apparatus for recording and/or reproducing information by using a card-like information recording medium as a recording medium and, more particularly, to an apparatus for transporting a card-like recording medium, which is arranged in a cleaning device for removing fingerprints, oil, dust, or the like from a surface of the recording medium. The transporting apparatus is suitably used as an apparatus for recording and/or reproducing information on and/or from a card-like optical information medium (to be referred to as an optical card, hereinafter) or a card-like magnetic recording medium (to be referred to as a magnetic card, hereinafter), or as a card-like information recording medium transporting apparatus arranged in a cleaning device for cleaning the surface of the recording medium.

2. Related Background Art

Recording media for reproducing information with a light beam after information is recorded with a light beam are card-, disk-, and tape-like media. Of these types of media, an optical card is the most promising, due to easy fabrication, portability and easy access.

In an optical card, a plurality of parallel straight information tracks are formed in a predetermined area of the card surface. In an information recording/reproducing apparatus using an optical card as its recording medium, an optical beam spot is continuously moved relative to the optical card surface along the direction of the information tracks. In this manner, information is recorded or reproduced. When the optical beam spot has scanned a predetermined distance, the beam spot is moved by a predetermined distance in a direction perpendicular to the direction of the information tracks. During this perpendicular movement, information is not recorded or reproduced. The spot is then moved relative to the card surface along the direction of the information track, and information is recorded in or reproduced from the corresponding track. Then, the beam spot is alternately scanned in the direction parallel to the direction of the information track and in the direction perpendicular thereto a desired number of times.

However, such an optical card tends to be adversely influenced by dust, fingerprints, and the like attached to the surface of the recording medium. If a fingerprint is attached to the surface of the recording medium, recording or reproduction of information cannot be performed, in the worst case.

Attachment of dust, fingerprints, and the like on the surface of the recording medium in the optical card typically occurs when the card is loaded into or unloaded from the apparatus. When a user accidentally touches the surface of the recording medium in the card, dust or fingerprints is attach to it. When the user waits for the card in the standby position so as to remove the card, partial ejection of the recording medium surface of the card outside the apparatus may cause attachment of dust on the recording medium surface.

SUMMARY OF THE INVENTION

The present invention has been made in consideration of the conventional problems described above, and has as its object to provide an apparatus for transporting a card-like information recording medium, which is arranged in an apparatus using the card-like information recording medium, the transporting apparatus being capable of preventing dust, fingerprints, and the like, which adversely influence recording and/or reproduction of information, from being attached to the medium during unloading of the card.

It is another object of the present invention to provide an apparatus for transporting a card-like information recording medium, which is arranged in an apparatus using a card-like information recording medium, the transporting apparatus having increased operability during insertion and discharge of the card.

The above objects can be achieved by an apparatus for transporting a card-like information recording medium, according to the present invention to be described hereinafter with reference to preferred embodiments.

BRIEF DESCRIPTION OF THE DRAWINGS

FIGS. 15A and 15B are plan views showing a card transport mechanism according to a seventh embodiment of the present invention, in which FIG. 15A shows a card position during card insertion and FIG. 15B shows a card position during card discharge;

FIGS. 20A and 20B are side views showing a card transport mechanism according to a ninth embodiment of the present invention, in which FIG. 20A shows a card position during card insertion and FIG. 20B shows a card position, during card discharge;

DESCRIPTION OF THE PREFERRED EMBODIMENTS

Preferred embodiments according to the present invention will be described in detail with reference to the accompanying drawings. An operation will be described when a transport apparatus is incorporated in an information recording/reproducing apparatus.

Figure 1:
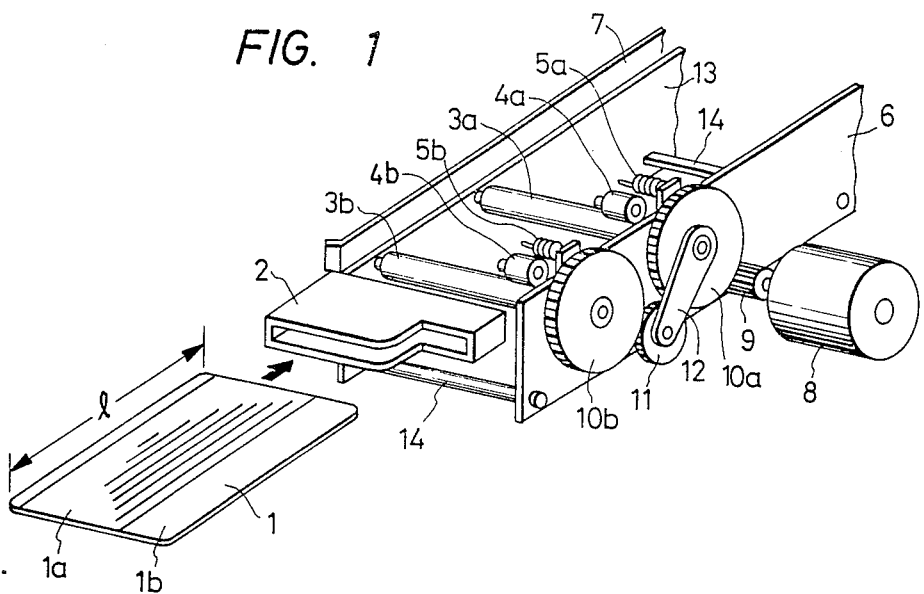
FIG. 1 is a perspective view showing a card transport mechanism according to a first embodiment of the present invention.
Figure 2A:
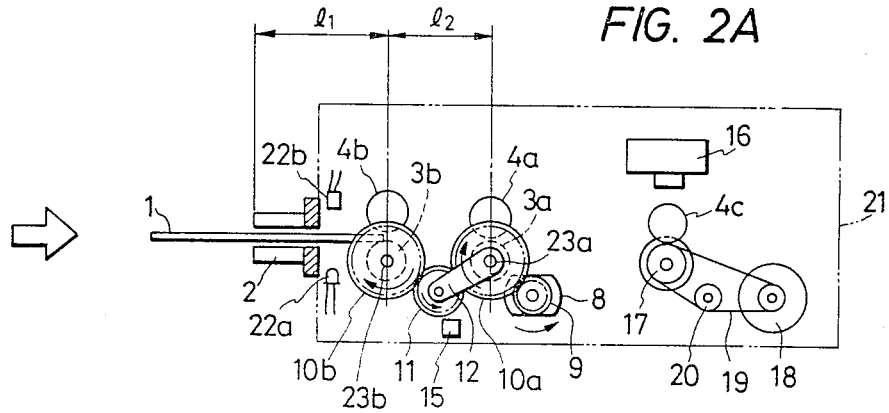
FIGS. 2A and 2B are side views showing operations of the individual constituting components during card insertion or discharge in the transport mechanism shown in FIG. 1.
Figure 2B:
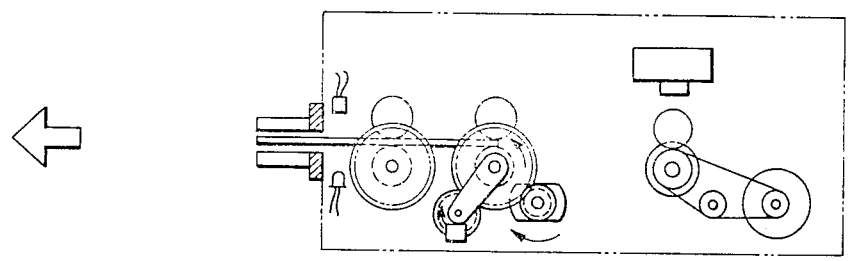
Figure 3A:
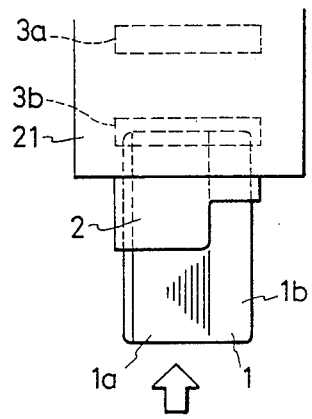
FIGS. 3A and 3B are plan views showing card positions during card insertion and discharge in the mechanism shown in FIG. 1.
Figure 3B:
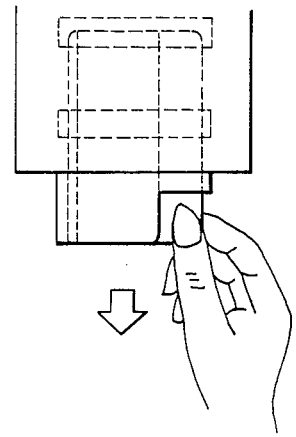

FIG. 1 is a perspective view of a card transport mechanism according to a first embodiment of the present invention, FIGS. 2A and 2B are side views showing operations during card insertion and discharge, and FIGS. 3A and 3B are plan views showing card positions during card insertion and discharge.

Referring to FIGS. 1 through 3B, a recording medium surface 1a is not formed on the entire area of an optical card 1 serving as an optical information recording medium. The optical card 1 has a non-recording portion 1b near its end portion. A card insertion port 2 has a notched portion corresponding to the non-recording portion 1b of the optical card 1.

The card transport mechanism also includes feed rollers 3a and 3b for feeding the card 1, and press rollers 4a and 4b cooperating with the feed rollers 3a and 3b to clamp the optical card 1. The press rollers 4a and 4b are biased by springs 5a and 5b to clamp the optical card 1.

A plate member 6 abuts against the card 1 and serves as a guide reference for the optical card when the card 1 is transported. A leaf spring 7 serves as an elastic member for pressing the end face of the card 1 against the plate member 6. The card 1 is transported by a motor 8 as a driving source. A pinion gear 9 is mounted on the shaft of the motor 8. Spur gears 10a and 10b are fixed on shafts 23a and 23b, respectively. The feed rollers 3a and 3b are also fixed on the shafts 23a and 23b, respectively. The shafts 23a and 23b are rotatable. A spur gear 11 is meshed with the spur gear 10a by a plate member 12 rotatably supported by the shaft 23a, thereby constituting a pair of pendulum gears. A means (not shown), such as a spring washer, is mounted on the spur gear 11 to bias it upward.

A plate member 13 supports the feed rollers 3a and 3b through the plate member 6 and two columns 14. A projection member 15 shown in FIGS. 2A and 2B serves as a stopper for the plate member 12 when the rotational direction of the spur gear 10a is the direction of card discharge.

Referring to FIGS. 2A and 2B, an optical head 16 is arranged to record information in or reproduce information from the optical card 1. A feed roller 17 reciprocally feeds the optical card 1 so as to allow the optical head 16 to record information in or reproduce information from the optical card 1. The roller 17 is driven by a motor 18 as a driving source. The driving force of the motor 18 is transmitted to the roller 17 through a timing belt 19 serving as a power transmitting means. An idler pulley 20 is brought into rolling contact with the inner side of the timing belt 19 to keep it taut. The above members are mounted in a case 21. A press roller 4c is in rolling contact with the roller 17.

An LED 22a serves as a light source for detecting the presence/absence of the optical card 1. A light-receiving element (e.g., a photodiode) 22b is located at a position opposite to the LED 22a to detect light from the LED 22a.

During card insertion, card insertion operation (auto loading) of the card is performed at a position shown in FIGS. 2A and 3A. A card sensor consisting of the LED 22a and the light-receiving element 22b detects the presence/absence of the card. When the presence of the card is detected, the motor 8 is operated to rotate the pinion gear 9. The spur gear 10a is rotated to drive the card 1 in the card transport direction (i.e., a direction shown in FIG. 2A) by the driving force of the motor 8 transmitted to the spin gear 10A by pinion gear 9. At the same time, the roller 3a is rotated through the shaft 23a in the card transport direction. The spur gear 11 provided to the plate member 12 is engaged with the spur gear 10b through a biasing means (not shown). The driving force of the motor 8 is thus transmitted to the spur gear 10b. Since the feed roller 3b is fixed to the shaft 23b of the spur gear 10b, the roller 3b is rotated in the card transport direction, accordingly.

Assume that the length of the optical card 1 along the longitudinal direction is given as l. If the optical card 1 is manually inserted in the card insertion port 2 by a distance of $l_1$, the card 1 can be automatically loaded in the apparatus. FIG. 3A is a plan view showing the corresponding card insertion position.

When the card 1 is received in the apparatus, forward rotation of the motor 18 shown in FIGS. 2A and 2B is transmitted to the feed roller 17 through the timing belt 19, and the optical card 1 is reciprocally moved. Therefore, the optical head 16 can record information in or reproduce information from the optical card 1.

During card discharge, the motor 8 and the pinion gear 9 are rotated in the reverse direction, as shown in FIGS. 2B and 3B. The spur gear 10a is rotated in the reverse direction. The plate member 12 and the spur shaft 11 are rotated about the shaft 23a so as to separate from the spur gear 10b and are stopped when the plate member 12 abuts against the stopper member 15.

The rotational force is not transmitted to the spur gear 10b. The card 1 is transported to the position to which driving force of the feed roller 3a acts on the spur gear 10b. Therefore, the card 1 is automatically stopped at a position where the card insertion port 2 overlaps a card end (i.e., $l = l_1 + l_2$).

In this state, as shown in FIG. 3B, the card insertion port is partially notched and only part of the non-recording portion 1b of the card 1 is exposed outside. When the card 1 is pulled from the apparatus, the user need only hold the non-recording portion 1b of the card 1. Thereby, the user will not accidentally hold the medium surface and will not adversely affect recording and/or reproduction, since no fingerprints are attached to the medium surface.

During card discharge, the card 1 is stopped such that the recording medium surface 1a is not exposed outside the apparatus while the card 1 is held by the rollers. If the user forgets to remove the card 1 for a long period of time, dust or the like will not be attached to the information recording surface of the card 1.

In the above embodiment, two feed rollers are used to transport the card. The driving force of the first feed roller is changed by using pendulum gears during card insertion and discharge, thereby switching the card reception position during card insertion and the card stop position during card discharge. However, without using the mechanical pendulum gears, the feed rollers and the motors as the driving sources may be independently driven. The motors may be switched in the card insertion and discharge modes to obtain the same effect as described above.

One feed roller and one stepping motor as a driving source may be used and the number of steps may be changed in the card insertion and discharge operations, thereby obtaining the same effect as described above.

One feed roller may be used, and an encoder may be mounted on the motor shaft of the motor as a driving source. In this case, the number of pulses is changed to obtain the same effect as described above.

Since auto loading (reception operation) begins started when the card is inserted halfway into the card insertion port, the card can be easily inserted without degrading operability for card insertion.

In the above embodiment, the means for transporting the card includes rollers at a position where the card is vertically clamped. However, a belt may be used in place of the rollers to transport the card.

In the above embodiment, during card discharge, the card is clamped and stopped between the OFF feed roller $3b$ and the press roller $4b$. The card does not slip from the insertion port even if the apparatus is inclined or if vibrations act on the apparatus.

When the card is manually removed, the feed and press rollers which clamp the card therebetween are idled and the user can remove the card with a small load.

A distance $l_2$ between the contact points of the feed rollers $3b$ and $3a$ with respect to the card is preferably $\frac{1}{4}$ to $\frac{1}{2}$ the length l of the card along the card transport direction. If the distance $l_2$ is shorter than $\frac{1}{4}$ of the length l, it is difficult to stably hold the card during the card discharge operation. However, if the distance $l_2$ is longer than $\frac{1}{2}$ of the length l, a heavy load acts on the card when the card is manually removed.

Figure 4:
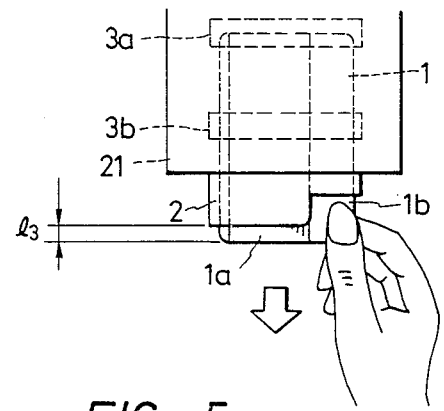
FIG. 4 is a plan view showing a card position during card discharge.

In the above embodiment, only the non-recording portion of the card is exposed outside the apparatus. However, the apparatus need only be designed such that the user can only hold the non-recording portion of the card when removing the card by his hand from the apparatus. As shown in FIG. 4, the recording medium surface $1a$ of the card may be slightly exposed outside the apparatus if the exposed portion cannot be held or touched by hand. An exposure length $l_3$ of the card recording medium surface $1a$ preferably falls within the range of 5 mm.

In the first embodiment of the present invention, two feed rollers are used to transport the card. The driving force for the first feed roller is switched by using the pendulum gears during the card insertion and discharge operations, thereby changing the card reception position and the card discharge stop position. However, without using such mechanical pendulum gears, two card position sensors may be respectively arranged at a position immediately behind the card insertion portion in the apparatus and a position near the end portion of the card located at the card discharge stop position, and one feed roller and one motor shaft may be used to obtain the same effect as in the above embodiment. An embodiment for the above arrangement will be described below.

Figure 5:
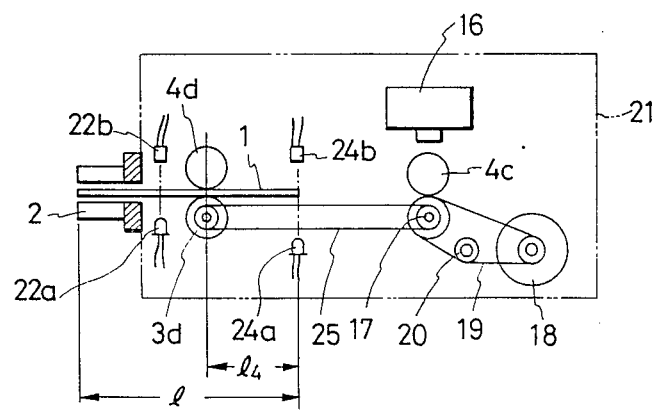
FIG. 5 is a side view of a card transport mechanism according to a second embodiment of the present invention.

FIG. 5 is a side view showing a second embodiment of the present invention. Like reference numerals as in the first embodiment denote like parts in the embodiment of FIG. 5.

Referring to FIG. 5, an optical card 1 as an optical information recording medium is inserted in a card insertion port 2 as in the first embodiment. A card transport mechanism of this embodiment includes a feed roller $3d$ for transporting the card 1, and a press roller $4d$ cooperating with the feed roller $3d$ to clamp and feed the card 1. The press roller $4d$ presses the card 1 by means of a spring (not shown).

An optical head 16 is arranged to record information in or reproduce information from the optical card 1. A feed roller 17 is used to reciprocally move the card 1 so as to allow the optical head 16 to perform recording or reproduction with respect to the optical card 1. A motor 18 serving as a driving source drives the rollers $3d$ and 17. Timing belts 19 and 25 serve as power transmitting means for transmitting the driving force of the motor 18 to the rollers $3d$ and 17. A idler pulley 20 is in rolling contact with the inner portion of the timing belt 19. The above members are mounted in a case 21. A press roller $4c$ is in rolling contact with the feed roller 17.

LEDs $22a$ and $24a$ as light sources are arranged to detect the presence/absence of the card 1. Light-receiving elements (e.g., photodiodes) $22b$ and $24b$ are located at positions opposite to the LEDs $22a$ and $24a$ to detect light beams therefrom, respectively.

The card 1 is fed by a guide mechanism (not shown) in a card transport direction.

The operation of this embodiment having the above arrangement will be described below.

During card insertion, the same card reception operation as in the first embodiment is performed. More specifically, the presence/absence of the card is detected by a card sensor consisting of the LED $22a$ and the light-receiving element $22b$. If the presence of the card is detected, the motor 18 is operated to rotate the feed roller $3d$ through the timing belts 19 and 25 serving as the power transmitting means in the card reception direction. Therefore, when the user pushes the card to the position of the feed roller $3d$, the card 1 can be automatically loaded inside the apparatus.

After the card 1 is received in the apparatus, the forward and reverse rotational forces of the motor 18 are transmitted to the feed roller 17 through the timing belt 19, and the optical card 1 is reciprocally moved to allow the optical head 16 to record information in or reproduce information from the optical card 1.

During card discharge, the feed rollers 17 and $3d$ are rotated in the card discharge direction from a state wherein the card is clamped between the feed roller 17 and the press roller $4c$. The optical card 1 is transported toward the card insertion port 2. When the leading end of the optical card 1 (the left end in FIG. 5) passes through a position of a card sensor consisting of the LED $24a$ and the light-receiving element $24b$, the card sensor detects the presence of the card. The card 1 is further transported and passes through the feed roller $3d$ and the press roller $4d$. The trailing end of the optical card 1 passes through the position of the card sensor consisting of the LED $24a$ and $24b$, and the absence of the optical card is detected. In this state, the motor 18 and hence the feed roller $3d$ are stopped.

Since the card insertion port 2 is partially notched to partially expose the non-recording portion of the card outside the apparatus in the same manner as in the first embodiment, the user can hold only the non-recording portion in order to pull out the card from the apparatus. Therefore, accidental holding of the medium surface and attachment of fingerprints or the like, which adversely affect recording and/or reproduction can be satisfactorily prevented.

According to this embodiment, during card discharge, the card 1 is clamped and stopped between the feed roller 3d and the press roller 4d. Therefore, the card is not slip from the card insertion port, even if the apparatus is inclined or vibrations act on the apparatus.

When the user pulls the card by hand from the card insertion port, the feed roller 3d and the press roller 4d are idled and the user can remove the card with a small load.

A distance $l_4$ between the contact point of the roller 3d with respect to the card and the trailing end (the right end in FIG. 5) of the card at the card discharge stop position preferably falls within the range of $\frac{1}{4}$ to $\frac{1}{2}$ of the length $l$ of the card in the card transport direction. If the distance $l_4$ is shorter than $\frac{1}{4}$ of the length $l$, the card cannot be stably held by the feed roller 3d and the press roller 4d during the card discharge operation. However, if the distance $l_4$ is longer than $\frac{1}{2}$ of the length $l$, a heavy load acts on the feed roller 3d and the press roller 4d when the user pulls the card from the apparatus.

In the above embodiment, the card insertion port is partially notched. However, part of the card insertion port need not be notched. An embodiment in which the card insertion port is not notched will be described below.

Figure 6:
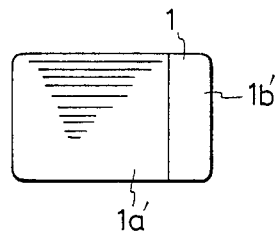
FIG. 6 is a plan view showing a card.
Figure 7A:
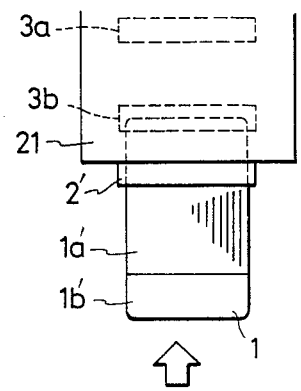
FIGS. 7A and 7B are plan views showing card positions during card insertion and discharge in a card transport mechanism according to a third embodiment of the present invention, the card transport mechanism being adapted to use the card shown in FIG. 6.
Figure 7B:
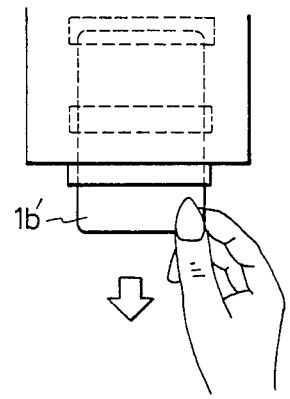

FIG. 6 and FIGS. 7A and 7B show a third embodiment of the present invention. More specifically, FIG. 6 is a plan view showing a card of this embodiment, and FIGS. 7A and 7B are plan views showing card positions during card insertion and discharge, respectively. The arrangements, except for the card and the card insertion port, are the same as those of the first embodiment, and a detailed description thereof will be omitted.

Referring to FIG. 6, an optical card 1 serves as an optical information recording medium. A recording medium surface 1a' is not formed on the entire surface of the optical card 1. A non-recording portion 1b' is formed throughout one end portion of the optical card 1. The card 1 is inserted in a card insertion port 2'.

During card insertion, the card is received at a position indicated in FIG. 7A in the same manner as in the first embodiment. During card discharge, the card 1 is discharged to the position to which a driving force of a feed roller 3a reaches. Therefore, the card 1 is stopped separated from the feed roller 3a.

In this state, since the non-recording portion 1b' of the card 1 is exposed outside of the card insertion port 240, as shown in FIG. 7B, the user need hold only the non-recording portion 1b' of the card 1 in order to pull the card from the card insertion port. Accidental holding of the medium surface and attachment of fingerprints, which adversely affect recording and reproduction, can be prevented.

In the above embodiment, the non-recording portion 1b' of the card 1 is entirely exposed outside the apparatus during card discharge. However, if the non-recording portion 1b' is wide, it may be partially exposed outside the apparatus.

Other embodiments of the present invention will be described below.

Figure 8:
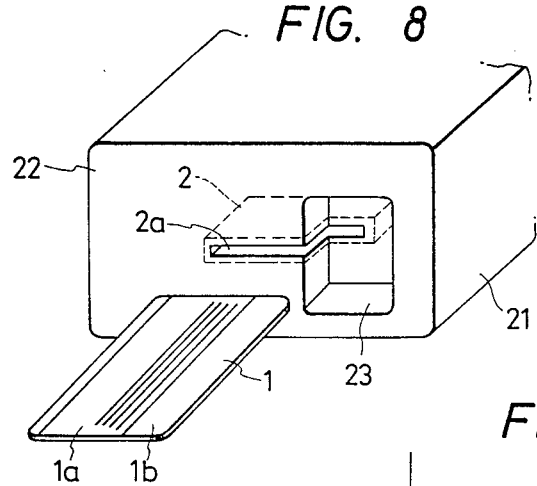
FIG. 8 is a perspective view showing a fourth embodiment of the present invention.
Figure 9:
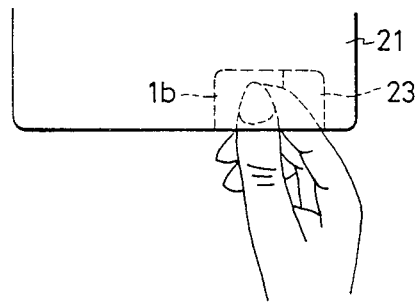
FIG. 9 is a plan view of the embodiment shown in FIG. 8.

FIG. 8 is a perspective view showing a fourth embodiment of the present invention, and FIG. 9 is a plan view of this embodiment.

The card insertion port in the embodiment of FIG. 1 extends outward from the case of the apparatus. However, in the apparatus of FIG. 8, a card insertion port is arranged inside the apparatus. An opening 2a is formed in a front panel 22 of the apparatus to insert the card into or discharge it from the apparatus. The opening 2a is coupled to an insertion port 2 formed inside the apparatus.

A recessed portion 23 is formed in the front panel 22. A card transport means is arranged inside the apparatus and is designed to automatically stop the card 1 at a position (FIG. 9) during card discharge. In this state, only the non-recording surface 1b of the card 1 is exposed from the recessed portion 23. The user need hold only this exposed portion in order to pull the card outside the apparatus. Therefore, in the same manner as in FIGS. 3B, the user does not accidentally hold the medium surface 1a, and attachment of fingerprints and the like, which adversely affect recording and reproduction, can be prevented.

In the embodiment shown in FIGS. 8 and 9, any projection is omitted to provide good appearance in design concept. In addition, a user's hand or an object will not accidentally bump against the projection. Therefore, this apparatus is suitable for public use.

Figure 10:
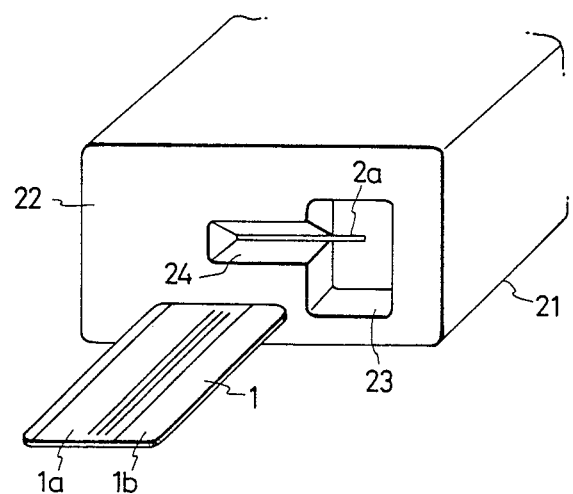
FIG. 10 is a perspective view showing a fifth embodiment of the present invention.

FIG. 10 is a perspective view of a fifth embodiment of the present invention. This embodiment exemplifies an apparatus obtained by modifying the apparatus in FIG. 8.

An introduction portion 24 is provided to an opening 2a in the embodiment of FIG. 10. When the user inserts the optical card 1 into the card insertion port, the card 1 may be temporarily placed on the introduction portion 24 for ease of insertion of the card 1, thereby improving operability.

The "recording medium surface of the card"[in the description of the embodiments of the present invention represents an "information recording area of the card". The information recording area is defined as an area in which a head for performing recording and/or reproduction is operated. In particular, the information recording area of the optical card is an area in which AF (auto focusing) and/or AT (auto tracking) functions. The optical card area in which AF and/or AT functions is an area in which information can be recorded and/or reproduced, an area in which information for classifying and retrieving the recorded contents of the recording area is stored, an area for reversing the moving direction of the head with respect to the optical card, and the like. The "non-recording portion of the card" represents an "area of non-recording of the card". non-recording area is defined as an area in which the head for performing recording/or reproduction does not function. In particular, the non-recording area in the optical card is an area in which AF (auto focusing) and/or AT (auto tracking)does not function. In the following description, the "recording medium surface" is defined as the "information recording area", and the "non-recording portion" is defined as the "non-recording area".

In the above embodiments, the apparatus for transporting the card-like recording medium is arranged such that the reception position during insertion of the card-like recording medium is different from the stop position during discharge of the card-like recording medium. However, the reception position need not be different from the discharge stop position. An embodiment will be described below in which the card reception position is the same as the discharge stop position.

Figure 11:
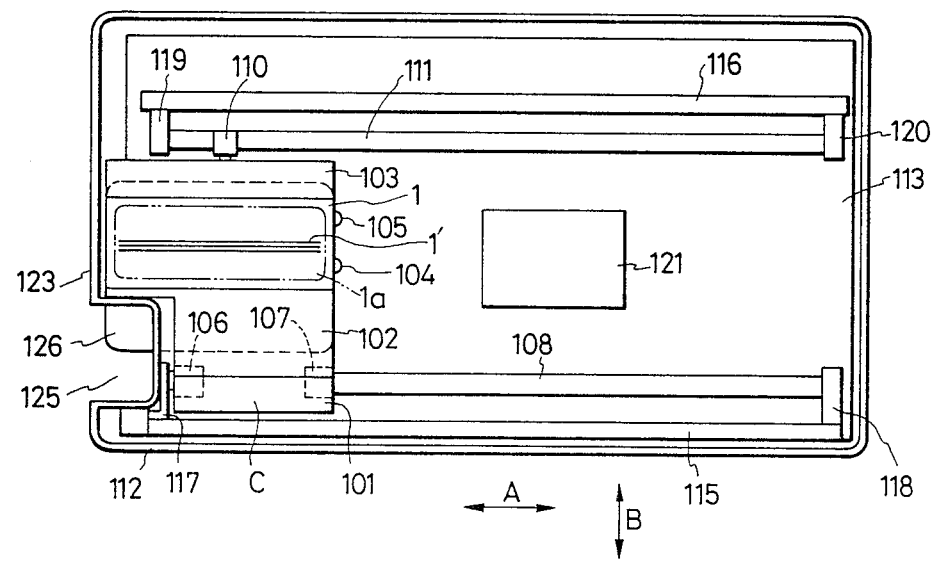
FIG. 11 is a sectional plan view showing a card transport mechanism according to a sixth embodiment of the present invention.
Figure 12:
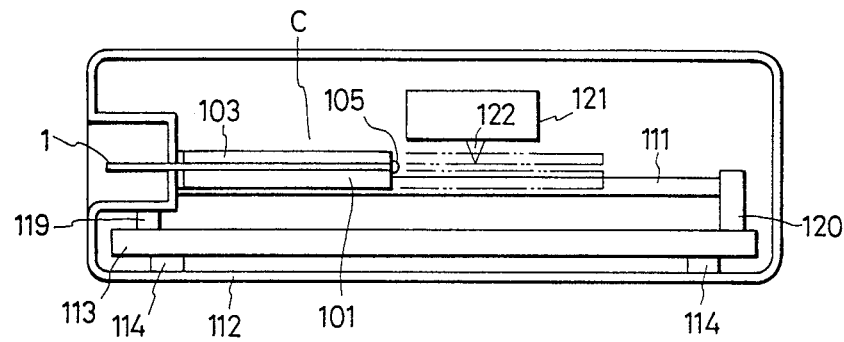
FIG. 12 is a side sectional view of the embodiment shown in FIG. 11.
Figure 13:
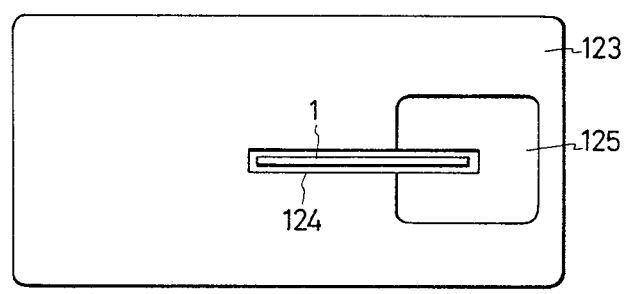
FIG. 13 is a front view of the embodiment shown in FIG. 11.
Figure 14:
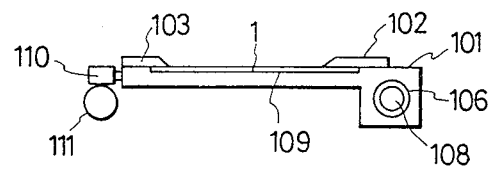
FIG. 14 is a partial enlarged view of the embodiment shown in FIG. 11.

FIGS. 11 through 14 show a sixth embodiment of the present invention, in which FIG. 11 is a sectional view thereof, FIG. 12 is a side view thereof, FIG. 13 is a front view thereof, and FIG. 14 is a detailed view thereof.

Referring to FIGS. 11 to 14, an optical card 1 has tracks 1 in which information has been or will be recorded. A large number of tracks 1' are formed on a recording medium surface 1a. A card transport mechanism includes a shuttle 101 having a flat portion for supporting the card 1, members 102 and 103 mounted on the shuttle 101 to hold part of the card 1 on the shuttle 101, and stoppers 104 and 105 for positioning the card 1. Bearings 106 and 107 are mounted in through holes at one end of the shuttle 101. A guide shaft 108 extends through the bearings 106 and 107.

A recessed portion 109 having substantially the same size as the optical card 1 is formed in the shuttle 101. The card 1 is inserted in the recessed portion 109 and horizontally fixed at a predetermined position on the shuttle 101. A guide roller 110 is rotatably mounted at the other end of the shuttle 101. The guide roller 110 can be rolled along the guide shaft 111. The shuttle 101 can be reciprocally moved by a drive mechanism (not shown) in a direction indicated by arrow A in FIG. 11.

A case 112 is connected to a frame 113 through an elastic member. Side walls 115 and 116 extend from the frame 113. An optical head supporting means (not shown) is arranged between the side walls 115 and 116 to support an optical head 121. Support members 117, 18, 119, and 120 extend from the frame 113 and support and fix the guide shafts 108 and 111. A light beam 122 (shown in FIG. 12) is emitted from the optical head 121 to scan the optical card 1.

The optical head 121 is movable by a means (not shown) in a direction indicated by arrow B in FIG. 11. With the above arrangement, the shuttle 101 can be reciprocally moved in the direction of arrow A and, at the same time, the optical head 121 can be moved in the direction of arrow B, so that the light beam scans the recording area of the tracks on the card.

The case 112 includes a front panel 123 and an opening 124 (shown in FIG. 13) formed in the front panel 123. The card 1 (shuttle 101) is inserted into or discharged from the apparatus through the opening 124. A recessed portion 125 is formed in the panel 123. When the shuttle 101 is located at the card discharge position (position C), part 126 of the non-recording portion 1b of the optical card 1 is exposed in the recessed portion 125 outside the apparatus. The recessed portion 125 has a size suitable for allowing the user to hold the part 126 of the card 1 for insertion in or discharge from the apparatus.

When the apparatus is to be operated, the shuttle 101 is located at position C and is locked by a locking mechanism (not shown). In, this state, the user holds the part 126 of the card not subjected to recording or reproduction and inserts the card 1 from the opening 124. The position of the opening 124 coincides with the position at which the shuttle 101 is located at position C. The card 1, inserted through the opening 124, is pushed inside the shuttle 101, held by the press members 102 and 103, and locked by the stoppers 104 and 105. Therefore, the card is fixed at the predetermined position on the shuttle 101.

Thereafter, locking of the card is released by a switch means (not shown), and the shuttle 101 is moved below the head 121. This operation is repeated by a number of times to complete recording or reproduction. When recording or reproduction is completed, a card discharge command is generated by a command means (not shown). The shuttle 101 is moved to position C and is locked. At this position, the user holds the exposed portion 126 of the card 1 and removes the card 1 outside the apparatus.

Since the user holds the non-recording portion 1b of the card 1 for insertion into or discharge it from the apparatus, the user will not accidentally hold the recording medium surface 1a of the card. Therefore, attachment of fingerprints on the recording medium surface of the card and erroneous recording or reproduction can be prevented.

In the sixth embodiment, the optical card 1 is inserted into the shuttle 101 and removed therefrom by hand. However, feed rollers may be arranged in the same manner as in the first embodiment to insert the card into or discharge it from the apparatus. An embodiment of this arrangement will be described below.

Figure 15A:
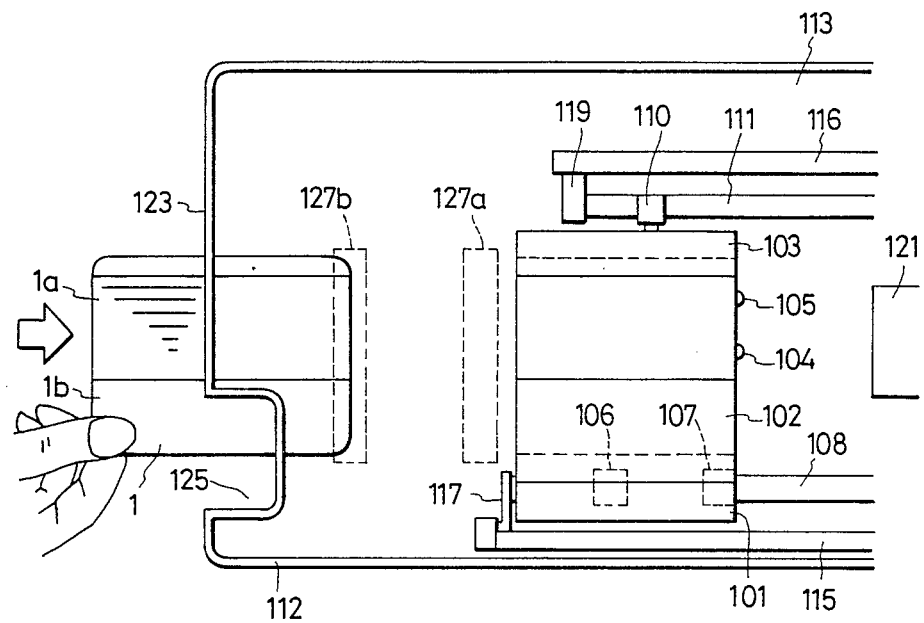
Figure 15B:
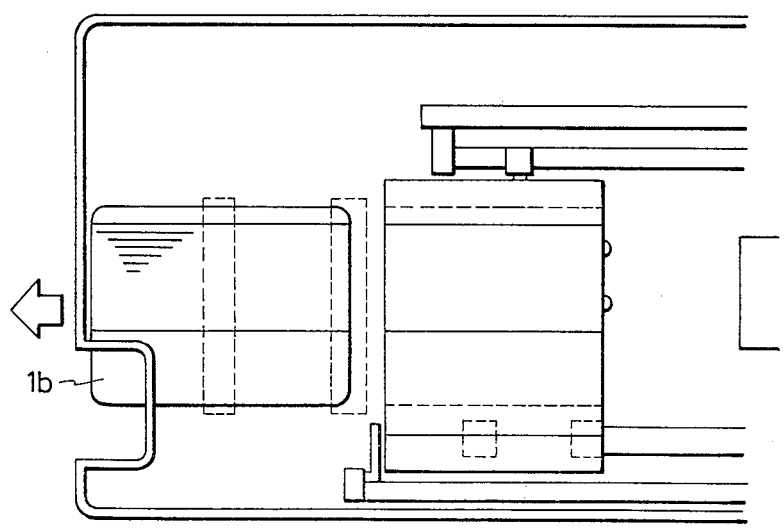

FIGS. 15A and 15B are plan views of a card transport mechanism according to a seventh embodiment of the present invention, in which FIG. 15A shows a card position during card insertion, and FIG. 15B shows a card position during card discharge.

Like reference numerals as in the sixth embodiment denote like parts in the seventh embodiment, and a detailed description thereof will be omitted. The card is guided by a guide mechanism (not shown).

During card insertion, the card reception operation is performed in the same manner as in the first embodiment. A card sensor (not shown) arranged immediately behind the card insertion port detects the presence/absence of the card. If the card sensor detects the presence of the card, feed rollers 127a and 127b are rotated by a driving source (not shown) in a card reception direction. Press rollers (not shown) cooperating with the feed rollers 127a and 127b to clamp and transport the optical card 1 are arranged in the same manner as in the first embodiment. Therefore, when the user pushes the card to the position of the feed roller 127b, the card 1 can be automatically received inside the apparatus and is fed to the shuttle 101.

During card discharge, the feed roller 127a is rotated by a driving source (not shown) in the card discharge direction to remove the card 1 from the shuttle 101. The card 1 is then transported to the card insertion port. In this case, since the driving force does not act on the feed roller 127b, the card 1 can be transported to the position to which the driving force of the feed roller 127a reaches. Therefore, the card is stopped, separated from the feed roller 127a.

As shown in FIG. 15B, only part of the non-recording portion 1b of the card is exposed from the card insertion port. The user holds the exposed portion and removes the card from the card insertion port. The user need not touch the recording medium surface of the card when pulling the card outside the apparatus. Attachment of fingerprints on the recording medium surface and adverse influences on recording and reproduction can be minimized.

In the seventh embodiment, the reception position during card insertion and the stop position during card discharge are switched without driving the feed roller 127b during card discharge. However, the means described in other embodiments may be used to change the card position.

In the above embodiments, transporting apparatuses using a card-like recording medium, having linear information tracks have been illustrated. However, the present invention is also applicable to an apparatus using a card-like recording medium having concentric or helical tracks. An embodiment using a card-like recording medium having concentric information tracks will be described.

Figure 16:
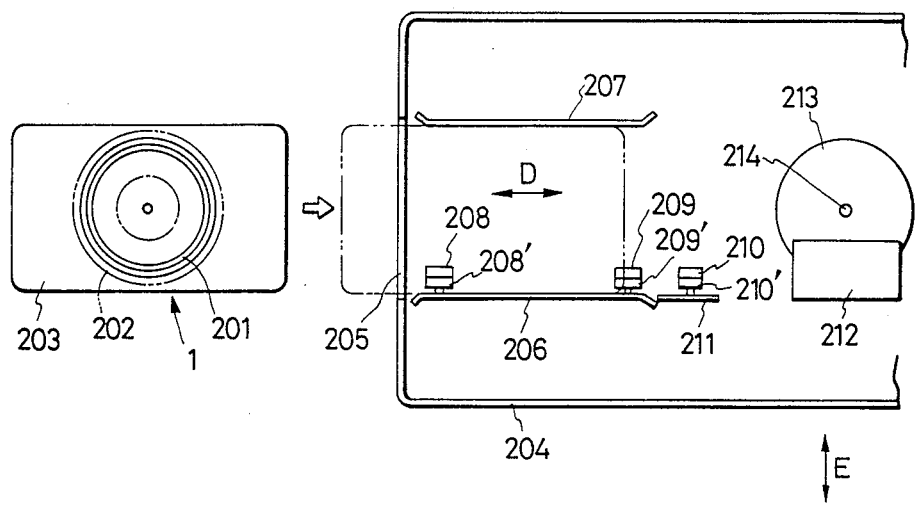
FIG. 16 is a longitudinal sectional view showing a card transport mechanism according to an eighth embodiment of the present invention.

FIG. 16 is a sectional view showing an eighth embodiment of the present invention.

An optical card 1 has concentric recording tracks 201. A large number of recording tracks 201 are formed on a recording medium surface 202. The optical card 1 also has a non-recording portion 203 in which the information tracks ar not formed.

The transporting apparatus includes a case 204. A card insertion port 205 is formed in the case 204. Guide plates 206 and 207 guide the card 1. Feed rollers 208, 209, and 210 are rotated by a driving means (not shown) to transport the card 1 in a direction indicated by arrow D. Driven rollers 208', 209' and 210' respectively cooperate with the feed rollers 208, 209, and 210 to clamp and feed the card 1. The roller 210 is mounted on a lever 211. An optical head 212 is supported by a driving means (not shown) and can be moved in a direction of arrow E.

A turntable 213 is rotated about a shaft 214. The turntable 213 causes a clamp mechanism (not shown) to clamp the card to rotatably support the card 1.

With the above arrangement, when the card 1 is inserted from the card insertion port, the card is detected by a detecting means (not shown), and the rollers 208 to 210 are rotated to transport the card 1 to the turntable 213. A positioning means is arranged on the turntable 213, or near it, to align the rotating shaft of the turntable 213 with the center of the tracks of the card. When the center of the tracks of the card is aligned with the rotating shaft of the turntable 213, the card 1 is fixed by the clamp means (not shown). Thereafter, the turntable 213 starts rotation. At the same time, the head 212 is moved in the direction of arrow E. A light beam emitted from the head 212 scans all tracks on the card 1. When the turntable 213 is rotated, the lever 211, the feed roller 210, and the driven roller 210' are located at positions that do not interfere with the rotation of the turntable 213.

When recording or reproduction of information is completed, the turntable 213 is stopped at a position by the positioning means (not shown) where the card longitudinal direction of the card is aligned with a direction indicated by arrow D. When clamping is released, the rollers 210 and 210' are sequentially moved toward the turntable 213 to clamp the card 1. The card 1 is transported toward the card insertion port When the trailing end of the card passes through the feed roller 209, the roller 209 is stopped in response to a signal from a detecting means (not shown). The card 1 is stopped at a position indicated by the dashed line in FIG. 16. In this case, only the non-recording portion 203 of the card 1 is exposed outside of the card insertion port. The user holds the exposed portion and pulls the card out of the apparatus. The user will not accidentally touch the recording medium surface 202 of the card. Therefore, attachment of fingerprints and degradation of recording and reproduction is minimized. In addition, the user need not clean fingerprints attached to the recording medium surface.

In the eighth embodiment, the reception position during card insertion and the card stop position during card discharge are switched by the sensor. However, the means used in the previous embodiments may be used to change the car position.

Figure 17:
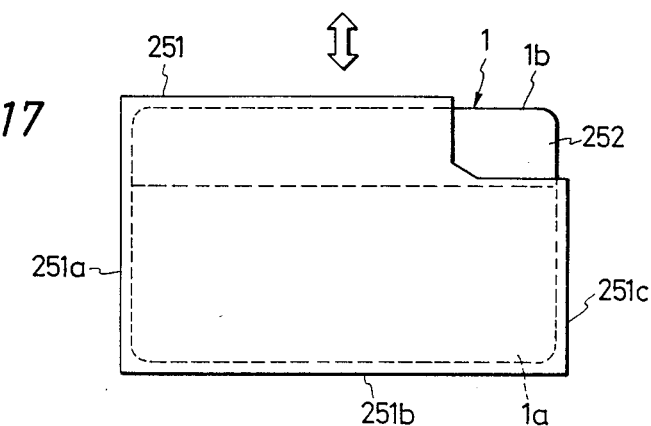
FIG. 17 is a plan view showing a card case.

The benefits of the present invention are enhanced utilized when the apparatus is used together with a card case shown in FIG. 17. FIG. 17 is a front view of a card case 251 for holding and transporting the optical card 1. Three sides 251a, 251b and 251c of the card case 251 are closed, and the remaining side is open. The optical card 1 can be accessed through the open side in directions indicated by the double-headed arrow. A notch is formed at the upper right corner of the card case 251. Only a portion 252 (FIG. 17) of the non-recording portion 1b of the card case. The user holds this portion to insert the card into or remove it from the card case 251. The portion 252 corresponds to the portion which is exposed from the apparatus at the card discharge position.

When the card is stored or carried, the card is inserted into the card case 251 to prevent damage to the recording medium surface, contamination or fingerprints. In addition, the recording medium surface can be shielded from sunlight and other undesirable factors.

When the card is to be used, the user removes the card from the case and inserts it in the apparatus described above. In this case, the user can hold the portion 252 and can directly insert the card into the apparatus without regrasping the card. When the card is to be removed from the apparatus and inserted in the card case, only the portion 252 of the non-recording portion of the card is exposed from the apparatus at the card removal position. The user holds the exposed portion and can insert it into the case without regrasping the card.

When the card is removed from the card case and inserted into the apparatus and when the card is removed from the apparatus and inserted into the card case, the user touches only the portion 252. Such an arrangement mimimizes the possibility of the user accidentally touching the recording medium portion of the card.

The foregoing illustrates how the present invention is applied to the information recording/reproducing apparatus. The present invention can also be applied to a cleaning apparatus for removing fingerprints, oil, dust, or the like from the medium surface of the card-like information recording medium.

An embodiment exemplifying a cleaning apparatus will be described with reference to the accompanying drawings.

Figure 18:
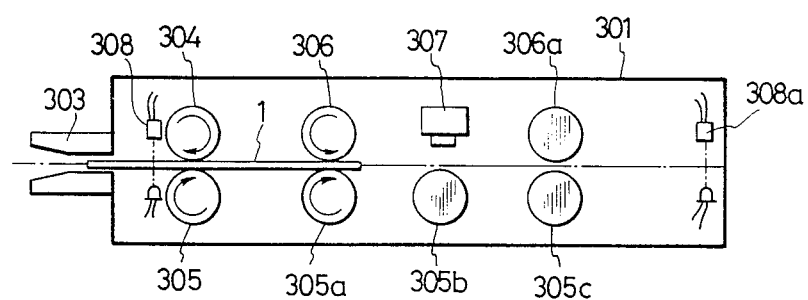
FIG. 18 is a side sectional view showing a conventional cleaning device.
Figure 19:
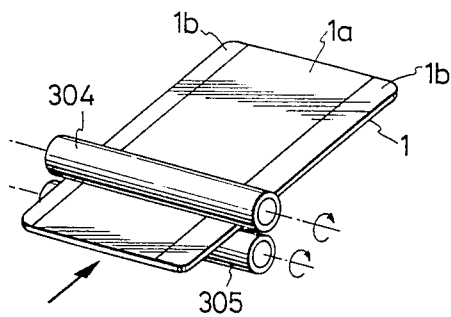
FIG. 19 is a perspective view showing the main part of the cleaning device shown in FIG. 18.

FIG. 18 is a schematic side sectional view of a cleaning apparatus proposed in copending U.S. Ser. No. 409,993 (same assignee). In this case, the cleaning apparatus is applied to an optical card recording/reproducing apparatus. FIG. 19 is a perspective view showing the main part of the cleaning apparatus shown in FIG. 18.

Referring to FIGS. 18 and 19, a recording/reproducing apparatus includes a housing 301. An insertion port 303 is formed at one side surface of the housing 301 to insert an optical card 1 serving as an information recording medium into or to remove it from the housing 301. Feed rollers 305, 305a, 305b, and 305c are arranged along an optical card insertion direction in the order named and can be rotated by a motor (not shown) as a driving source in one direction. Driven rollers 306 and 306a are respectively paired with the feed rollers 305a, and 305c. A cleaning roller 304 paired with the feed roller 305 is located at a position closest to the insertion port 303. The cleaning roller 304 is rotated together with the feed roller 305 by a motor (not shown) in the same direction as the feed rollers. The traveling directions of the opposing surfaces of the feed roller 305 and the cleaning roller 304 are opposite. The cleaning roller 304 is made of an elastic material which can absorb contamination, such as a fingerprint or oil. An optical head 307 is arranged to optically record information in the optical card 1 or read information from the optical card 1. Photosensors 308 and 308a detect the presence/absence of the optical card 1 to control the direction of rotation of the feed rollers 305, 305a, 305b, and 305c.

In this embodiment, the feed roller 305 and the cleaning roller 304 constitute a cleaning apparatus.

The recording medium surface 1a is not formed on the entire surface of the optical card 1, and the non-recording portion 1b is formed near the card end portion.

In the cleaning apparatus with the above arrangement, when the optical card 1 is inserted from the card insertion port 303, the presence of the optical card 1 is detected by the photosensor 308. Upon this detection, the feed rollers 305 to 305c are rotated clockwise. At the same time, the cleaning roller 304 is rotated clockwise. A distance between the rollers 304 and 305 is determined such that a predetermined pressure is applied from the cleaning roller 304 to the optical card 1 located on the feed roller 305. The materials of the rollers are selected such that a frictional force between the feed roller 305 and the optical card 1 is set to be larger than that between the cleaning roller 304 and the optical card 1. The card 1 is fed to the right in the direction shown in the drawing, upon rotation of the feed roller 305. In this case, the upper surface (i.e., the information recording surface) of the optical card 1 is moved at a relatively high speed while being in contact with the cleaning roller 304. The contamination attached to the upper surface of the optical card 1 is wiped or scattered toward the insertion port 303, thereby cleaning the information recording surface.

The optical card 1 cleaned by the cleaning apparatus in this manner passes between the feed roller 305a and the driven roller 306 and reaches the feed roller 305b under the optical head 307. Information is recorded on or reproduced from the card 1 there. The card 1 then passes between the feed roller 305c and the driven roller 306a. When the photosensor 308a detects presence of the optical card 1, the rotational direction of the feed rollers 305 to 305c is reversed.

The optical card 1 is transported in the reverse direction and is discharged outside the apparatus from the insertion port 303. In this case, a biasing force of the cleaning roller 304 may be released from the optical card 1.

In the above apparatus, the cleaning surface of the cleaning roller 304 travels in the opposite direction to the movement of the card 1 at a contact position between the cleaning roller 304 and the card 1. Therefore, relatively large contamination such as dust is scattered toward the insertion port 303 and is prevented from entering the housing 301.

Figure 20A:
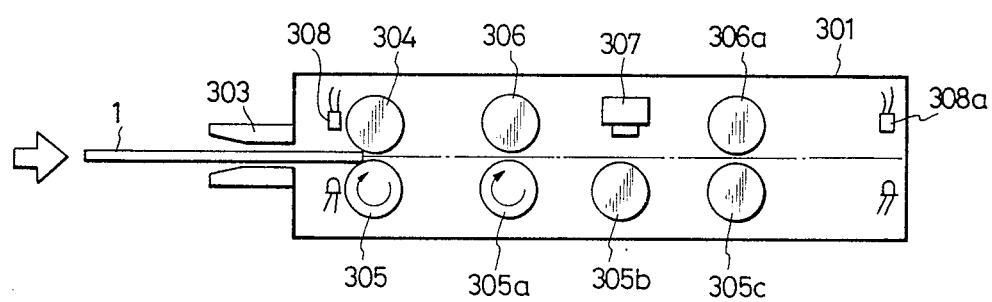
Figure 20B:
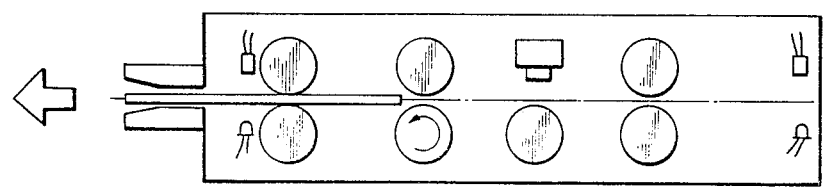

FIGS. 20A and 20B are schematic side views showing another embodiment in which the present invention is applied to the above-mentioned cleaning apparatus, in which FIG. 20A shows an operation of the components during card insertion and FIG. 20B shows an operation of the component during card discharge. Like reference numerals as in FIG. 18 denote like parts in FIG. 20A and 20B, and a detailed description thereof will b omitted.

During card insertion, the card reception operation (auto loading) is performed at a position shown in FIG. 20A. The presence/absence of the card 1 is detected by a photosensor 308. If the photosensor 308 detects the presence of the card, feed rollers 305 to 305c are rotated lockwise by a motor (not shown) as a driving source. When the user pushes the card 1 to the position of the feed roller 305, the card is automatically loaded in the apparatus.

During card discharge, the feed rollers 305a to 305c are rotated counterclockwise by the motor (not shown) as a driving source. Since no rotational force acts on the feed roller 305, the card 1 is transported to the position to which the driving force of the feed roller 305a can reach. Since the distance between the end of the card insertion port 303 and the feed roller 305a is set to be equal to the length of the card along the longitudinal direction, the card 1 is automatically stopped at a position overlapping the card insertion port end and the card end.

Figure 21:
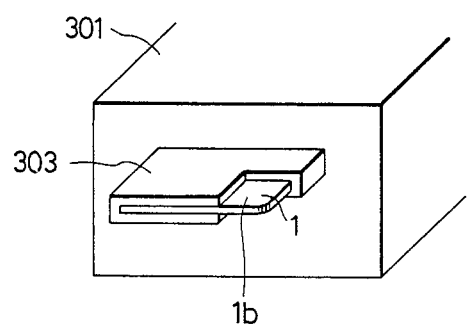
FIG. 21 is a perspective view showing a state during card discharge in the embodiment shown in FIGS. 20A and 20B.

In this state, only a non-recording portion 1b of the card is exposed outside the apparatus through the card insertion port, as shown in FIG. 21. Therefore, in order to pull the card from the apparatus, the user need only hold the non-recording portion 1b of the card 1. Therefore, the user cannot accidentally hold the cleaned recording medium surface. Therefore, attachment of contamination, such as a fingerprint or oil, to the cleaned card can be prevented.

Still another embodiment of the present invention will be described below.

In the above embodiment, the feed roller 305 for transporting the card is not driven during card discharge, thereby changing the card reception position and the card discharge stop position.

Two feed rollers may be used to change the driving force of the first feed roller by using pendulum gears during card insertion and discharge operations in the same manner as in the embodiment of FIG. 1, thereby obtaining the same effect as described above. The means described in the previous embodiments may be used to change the card position.

One feed roller and a stepping motor as a driving source may be used and the number of steps may be changed in the card insertion and discharge operations, thereby obtaining the same effect as described above.

One feed roller may be used and an encoder may be arranged on the motor shaft of a motor as a driving source. In this case, the number of pulses is changed to control the motor and hence the feed roller, thereby obtaining the same effect as described above.

Two position sensors may be respectively arranged at a position immediately behind the card insertion port of the housing or case of the apparatus and a card end position (corresponding to the card discharge stop position) along the longitudinal direction. In this case, the feed rollers and a motor (not shown) as a driving source may be controlled in response to outputs from the sensors, thereby obtaining the same effect as described above.

In the above embodiments, one card port is used to insert the card into or remove it from the apparatus. However, a card insertion port and a card discharge port may be separately formed so as to obtain the same effect as described. An embodiment of this arrangement will be described below.

Figure 22:
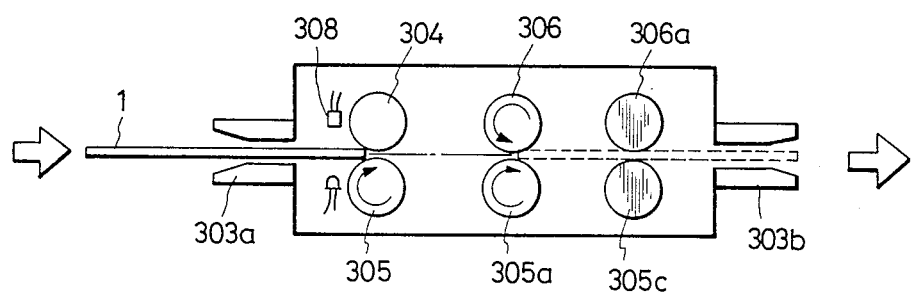
FIG. 22 is a side view showing a card transport mechanism according to a tenth embodiment of the present invention.

FIG. 22 is a schematic side view showing yet another embodiment in which the present invention is applied to a cleaning apparatus. Like reference numerals as in FIG. 20 denote like parts in FIG. 22, and a detailed description thereof will be omitted.

When the user inserts the card 1 from a card insertion port 303a, the presence/absence of the card is detected by a photosensor 308. When the photosensor 308 detects the presence of the card 1, feed rollers 305 and 305a are rotated clockwise by a motor (not shown) as a driving source. When the user inserts the card 1 to the feed roller 305, the card 1 is automatically loaded in the apparatus. Since no rotational force acts on the feed roller 305c, the card is transported to a position to which the driving force of the feed roller 305a reach. Therefore, the card 1 is stopped separated from the feed roller 305a.

In this state, as shown in FIG. 21, only a non-recording portion 1b of the card 1 is exposed outside the apparatus through the card discharge port. In order to pull the card from the apparatus, the user need only hold only the non-recording portion 1b of the card and cannot be accidentally hold the recording medium surface. Therefore, attachment of contamination, such as dust, a fingerprint, or oil to the recording medium surface can be prevented.

In the above embodiment, the feed roller 305c for transporting the card 1 is not driven to stop the card at the card discharge port. However, a card position sensor may be arranged at the end position of the card (corresponding to the card stop position) along the longitudinal direction. The feed roller for transporting the card and a motor (not shown) as a driving source may be controlled in response to outputs from the sensor to obtain the same effect as described above.

In the above embodiment, the apparatus uses an optical card as a card-like recording medium. However, the present invention is also applicable to a magnetic card apparatus. In magnetic card apparatuses, which are the most popular, adverse influences caused by dust, fingerprints, and the like are not such a serious consideration. At a stop position of the magnetic card, the recording medium surface of the magnetic card is exposed outside the apparatus. However, even in such a magnetic card apparatus, the present invention can be applied to perform a more stable recording and/or reproduction.

In the embodiment of the present invention, the card-like information recording medium has been explained. However, the information recording medium need not be card-like. If the information recording medium has an information recording area and an information non-recording area, the shape of the recording medium is not limited to any specific shape such as a sheet or disk. Any apparatus employing any information recording medium described above can employ the present invention to obtain the same effect as described above.

We claim:

1. An apparatus for transporting a card-like information recording medium, the card-like information recording medium having an information recording area and anon-recording areas, said apparatus comprising:
   receiving transport means for transporting the card-like information recording medium into said apparatus and for transporting the recording medium within said apparatus; and
   discharging transport means for discharging the card-like information recording medium outside said apparatus, said discharging transport means comprising means for transporting the card-like information recording medium and means for stopping the recording medium such that the information recording area remains within said apparatus.

2. An apparatus according to claim 1, wherein said discharging transport means comprises means for transporting the card-like information recording medium and means for stopping the recording medium, entirely exposing the non-recording area of the medium outside said apparatus.

3. An apparatus according to claim 1, wherein said discharging transport means comprises means for transporting the card-like information recording medium and means for stopping the recording medium, partially exposing the non-recording area of the recording medium outside said apparatus.

4. An apparatus according to claim 1, wherein said apparatus further comprises a recessed portion on an outer surface of said apparatus, said discharging transport means comprising means for transporting the card-like information recording medium and means for stopping the recording medium by said recessed portion.

5. An apparatus according to claim 4, wherein said discharging transport means comprises means for transporting the card-like information recording medium and means for stopping the recording medium, extending the recording medium from said recessed portion and locating the recording medium within the outer portion of said apparatus.

6. An apparatus according to claim 1, wherein said apparatus further comprises a discharge port, and wherein said discharging transport means comprises means for transporting the card-like information recording medium and means for stopping the recording medium, partially exposing the non-recording area of the recording medium from said discharge port.

7. An apparatus according to claim 1, wherein said apparatus further comprises a guide mechanism for guiding card-like information recording medium in a transport direction.

8. An apparatus according to claim 1, wherein said apparatus further comprises a receiving portion for receiving the card-like information recording medium in said apparatus by said receiving transport means.

9. An apparatus according to claim 1, wherein said receiving transport means comprises means for positioning the card-like information recording medium in a first position in said apparatus during reception of the recording medium and said discharging transport means comprises means for positioning the card-like information recording medium in a second position during discharge from said apparatus.

10. An apparatus according to claim 9, wherein the first and second positions of the card-like information recording medium during reception in said apparatus and discharge from said apparatus differ with respect to a housing of said apparatus.

11. An apparatus according to claim 1, further comprising means for performing one of optically recording information on and reproducing information from the card-like information recording medium which comprises an optical card.

12. An apparatus according to claim 1, further comprising means for performing one of magnetically recording information on and reproducing information form the card-like information recording medium which comprises a magnetic card.

13. An apparatus according to claim 1, wherein said discharging transport means comprises a roller.

14. An apparatus according to claim 1, wherein said discharging transport means comprises a belt.

15. An apparatus for recording information in and/or reproducing information from a card-like information recording medium, the recording medium having an information recording area and a non-recording area, said apparatus comprising:
- a head unit for recording information in and/or reproducing information from the card-like information recording medium;
- moving means for moving the card-like information recording medium relative to said head unit;
- receiving means for receiving the card-like information recording medium in said apparatus; and
- discharging means for discharging the card-like information recording medium outside said apparatus, said discharging means comprising means for transporting the card-like information recording medium and means for stopping the recording medium, such that the information recording area remains within said apparatus.

16. An apparatus according to claim 15, wherein said discharging means comprises means for transporting the card-like information recording medium and means for stopping the recording medium, partially exposing the non-recording area of the recording medium outside said apparatus.

17. An apparatus for cleaning a card-like information recording medium, the recording medium having an information recording area and a non-recording area, said apparatus comprising:
- cleaning means for cleaning the card-like information recording medium;
- moving means for moving the card-like information recording medium relative to said cleaning means;
- receiving means for receiving the card-like information recording medium in said apparatus; and
- discharging means for discharging the card-like information recording medium outside said apparatus, said discharging means comprising means for transporting the card-like information recording medium and means for stopping the recording medium, such that the information recording area remains within said apparatus.

18. An apparatus according to claim 17, wherein said discharging means comprises means for transporting the card-like information recording medium and means for stopping the recording medium, partially exposing the non-recording area of the medium outside said apparatus.

19. An apparatus for recording information in and/or reproducing the information form a card-like information recording medium, the recording medium having an information recording area and a non-recording area, said apparatus comprising:
- a head unit for recording information in and/or reproducing information from the card-like information recording medium;
- moving means for moving the card-like information recording medium relative to said head unit;
- an inserting port for inserting the card-like information recording medium into said moving means, said insertion port being formed in a housing of said apparatus; and
- a discharging port for discharging the card-like information recording medium from said moving means, said discharging port being formed in the housing of said apparatus,
- wherein said moving means comprises means for transporting the card-like information recording medium to said discharging port and means for stopping the recording medium such that the information recording area remains within said apparatus.

20. An apparatus according to claim 19, wherein said moving means further comprises means for transporting the card-like information recording medium to said discharging port and means for stopping the recording medium, partially exposing the non-recording area of the recording medium outside said apparatus.

21. An apparatus for recording information in and/or reproducing information from an information recording medium, the recording medium having an information recording area and a non-recording area, said apparatus comprising:
- a head unit for recording information in and/or reproducing information from the information recording medium;
- moving means for moving the recording medium relative to said head unit;
- receiving means for receiving the information recording medium in said apparatus; and
- discharging means for discharging the information recording medium outside said apparatus, said discharging means comprising means for transporting the information recording medium and means for stopping the recording medium such that the information recording area of the information recording medium remains within said apparatus.

22. An apparatus according to claim 21, wherein said discharging means comprises means for transporting the information recording medium for partially exposing the non-recording area of the recording medium outside said apparatus.

23. An apparatus for cleaning an information recording medium, the recording medium having an information recording area and a non-recording area, said apparatus comprising;
- cleaning means for cleaning the information recording medium;
- moving means for moving the information recording medium relative to said cleaning means;
- receiving means for receiving the information recording medium in said apparatus; and
- discharging means for discharging the information recording medium outside said apparatus, said discharging means comprising means for transporting the information recording medium and means for stopping the recording medium such that the information recording area of the information recording medium remains within said apparatus.

24. An apparatus according to claim 23, wherein said discharging means further comprises means for transporting the information recording medium and means for stopping the recording medium, partially exposing the non-recording area of the recording medium outside said apparatus.

25. An apparatus for transporting a card-like information recording medium, the recording medium having an information recording area and a non-recording area, and for using the card-like information recording medium in a system, said apparatus comprising:
 a card guide path along which the card-like information recording medium is guided in a predetermined direction;
 an outlet port through which the card-like information recording medium is discharged from said card guide path;
 first card transport means disposed successively from said outlet port along said card guide path in the predetermined direction, said first card transport means comprising means for transporting the card-like information recording medium to said outlet pot by said card guide path and means for topping the information recording medium at a stop position, containing the information recording medium at a stop position, containing the information recording area of the card-like information recording medium within said outlet port at the stop position.

26. An apparatus for transporting an information recording medium, the recording medium having an information recording area and a non-recording area, and for using the information recording medium in a system, said apparatus comprising:
 an information recording medium guide path along which the information recording medium is guided in a predetermined direction;
 an outlet port through which the information recording medium is discharged from said information recording medium guide path;
 first information recording medium transport means disposed successively from said outlet port along said information recording medium guide path in the predetermined direction, said first information recording medium transport means comprising means for transporting the information recording medium to said outlet port by said information recording medium guide path and means for stopping the information recording medium at a stop position, containing the information recording area of the information recording medium within said outlet port.

27. An apparatus for transporting a card-like information recording medium, said apparatus comprising:
 a card guide path along which the card-like information recording medium is guided in a predetermined direction;
 an inlet-outlet port through which the card-like information recording medium is inserted into said card guide path and the card-like information recording medium is discharged from said card guide path;
 a first card transport means disposed successively from said inlet-outlet port along said card guide path in the predetermined direction, said first card transport means comprising means for transporting the card-like information recording medium inserted along said card guide path in only the predetermined direction through said inlet-outlet port; and
 second card transport means disposed in the predetermined direction farther along the card guide path from said inlet-outlet port and said first card transport means, said second card transport means spaced a predetermined distance away from said first card transport means, said second card transporting means comprising means for transporting the card-like information recording medium in the predetermined direction and in a direction opposite the predetermined direction when the recording medium is inserted in said card guide path through said inlet-outlet path and transported by said first card transport means along the predetermined direction.

28. An apparatus for transporting a card-like information recording medium, the recording medium having an information recording area an a non-recording area, and for using the card-like information recording medium in a system, said apparatus comprising:
 receiving transport means for transporting the card-like information recording medium into said apparatus and for transporting the card-like information recording medium within said apparatus; and
 discharging transport means for discharging the card-like information recording medium outside said apparatus, said discharging transport means comprising means for transporting the card-like information recording medium and means for stopping the recording medium, preventing user access of the information recording area of the information recodin medium.

29. An apparatus according to claim 28, wherein said discharging transport means comprises means for transporting the card-like information recording medium and means for stopping the recording medium, partially exposing the non-recording area of the recording medium outside said apparatus.

* * * * *

UNITED STATES PATENT AND TRADEMARK OFFICE
CERTIFICATE OF CORRECTION

PATENT NO. : 4,950,877

DATED : August 21, 1990

INVENTOR(S) : Hideo Kurihara et al.

It is certified that error appears in the above-identified patent and that said Letters Patent is hereby corrected as shown below:

COLUMN 1

Line 59, "is" should be deleted.

COLUMN 2

Line 16, "invention" should read --invention,--.

COLUMN 5

Line 37, "distance 12" should read --distance $\ell_2$--; and
Line 49, "his" should be deleted.

COLUMN 6

Line 66, "and 24b," should read --and the light receiving element 24b,--.

COLUMN 7

Line 13, "is" should read --does--; and
Line 58, "240," should read --2',--.

UNITED STATES PATENT AND TRADEMARK OFFICE
CERTIFICATE OF CORRECTION

PATENT NO. : 4,950,877

DATED : August 21, 1990

INVENTOR(S) : Hideo Kurihara et al.

It is certified that error appears in the above-identified patent and that said Letters Patent is hereby corrected as shown below:

COLUMN 8

Line 41, "card"[in" should read --card" in--.

COLUMN 9

Line 22, "recessed portion 109 having" should read --recessed portion 109 (shown in FIG. 14) having--.

COLUMN 10

Line 5, "by" should be deleted; and
Line 14, "it" should be deleted.

COLUMN 11

Line 53, "card" should be deleted; and
Line 58, "port" should read --port.--.

COLUMN 12

Line 8, "car" should read --card--;
Line 10, "utilized" should be deleted;
Line 19, "the card case." should read --the card inserted in the card case 251 is exposed from the card case.--; and
Line 43, "touches only" should read --need only touch--.

UNITED STATES PATENT AND TRADEMARK OFFICE
CERTIFICATE OF CORRECTION

PATENT NO. : 4,950,877

DATED : August 21, 1990

INVENTOR(S) : Hideo Kurihara et al.

It is certified that error appears in the above-identified patent and that said Letters Patent is hereby corrected as shown below:

COLUMN 14

Line 8, "b" should read --be--.

COLUMN 15

Line 30, "only" should be deleted; and
　　　Line 34, "surface" should read --surfaces,--.

COLUMN 16

Line 2, "anon-recording areas," should read --a non-recording area,--; and
　　　Line 31, "medium by" should read --medium, partially exposing the non-recording area of the recording medium by--.

COLUMN 17

Line 7, "form" should read --from--; and
　　　Line 62, "form" should read --from--.

COLUMN 18

Line 3, "inserting" should read --insertion--.

UNITED STATES PATENT AND TRADEMARK OFFICE
CERTIFICATE OF CORRECTION

PATENT NO. : 4,950,877

DATED : August 21, 1990

INVENTOR(S) : Hideo Kurihara et al.

It is certified that error appears in the above-identified patent and that said Letters Patent is hereby corrected as shown below:

COLUMN 19

Line 20, "pot" should read --port-- and "topping" should read --stopping--;
　　Line 23, "medium" should be deleted;
　　Line 24, "at a stop position, containing the information re-" should be deleted; and
　　Line 25, "cording" should be deleted.

COLUMN 20

Line 18, "and" should read --than--;
　　Line 32, "an" (second occurrence) should read --and--; and
　　Line 46, "recordin" should read --recording--.

Signed and Sealed this

Second Day of April, 1991

Attest:

HARRY F. MANBECK, JR.

Attesting Officer　　　Commissioner of Patents and Trademarks